United States Patent
Chang et al.

(10) Patent No.: US 7,941,190 B2
(45) Date of Patent: May 10, 2011

(54) MOBILE PHONE

(75) Inventors: Ching-Sung Chang, Taipei (TW); Sea-Weng Young, Taipei (TW)

(73) Assignee: Inventec Appliances Corp., Taipei (TW)

( * ) Notice: Subject to any disclaimer, the term of this patent is extended or adjusted under 35 U.S.C. 154(b) by 531 days.

(21) Appl. No.: 12/081,749

(22) Filed: Apr. 21, 2008

(65) Prior Publication Data

US 2008/0293456 A1 Nov. 27, 2008

(30) Foreign Application Priority Data

May 21, 2007 (TW) .............................. 96118012 A

(51) Int. Cl.
*H04M 1/00* (2006.01)

(52) U.S. Cl. ................... 455/575.1; 455/573; 455/90.3

(58) Field of Classification Search ............. 455/566, 455/572, 573, 575.1, 90.3
See application file for complete search history.

(56) References Cited

U.S. PATENT DOCUMENTS

| | | | | |
|---|---|---|---|---|
| 6,201,951 | B1 * | 3/2001 | Duwaer et al. | 455/74.1 |
| 2002/0082042 | A1 * | 6/2002 | Mark et al. | 455/550 |
| 2003/0211834 | A1 * | 11/2003 | Wu et al. | 455/90.3 |
| 2006/0270444 | A1 * | 11/2006 | Miramontes | 455/550.1 |
| 2009/0264148 | A1 * | 10/2009 | Tom | 455/550.1 |

* cited by examiner

*Primary Examiner* — Temica M Beamer
(74) *Attorney, Agent, or Firm* — Birch, Stewart, Kolasch & Birch, LLP

(57) ABSTRACT

A battery cover of a mobile phone includes an input interface formed on one side thereof; and a wireless transmission module. The input interface is capable of operating thereon, and the wireless transmission module is capable of conducting wireless communication between the battery cover and the mobile phone when the battery cover is detached from the mobile phone.

11 Claims, 3 Drawing Sheets

MOBILE PHONE

FIELD OF THE INVENTION

The invention relates to a mobile phone, more particularly to a mobile phone having a battery cover of a specific structure to expand the operating modes thereof.

BACKGROUND OF THE INVENTION

The more the additional functions increases, the more concentration of every manufacturer is directed to the limited space as to make the outmost efficiency to accommodate the operating keys corresponding to the additional functions.

For instance, a traditional compact keyboard can be coupled to a PDA-phone (Personal Digital Assistant) in order to facilitate the user to compile or edit a text document. The key on such compact keyboard is too small in dimension and may lead the user to inconvenience during pressing of the keys, hence preventing fast data input. Most PDA-phones are equipped with hand written input devices consisting of a touch screen and a stylus for tapping input data and writing words or characters, thereby quickening the data input.

Another type of mobile phone is available in the market, wherein the mobile phone is equipped with an externally connected keyboard such that when the user requires additional keys for the added functions, the object can be achieved by attachment of the keyboard to the PDA. USB devices, wireless connection devices (like Bluetooth-enabled devices) can be implemented for coupling the keyboard to the PDA. The attachment of keyboard to the PDA in order to obtain the expanded keys though does not result in high cost, but decrease the portability of the mobile phone when considered from the user's views.

Therefore, under the consideration to provide multi-functions for the mobile phone and simultaneously for minimizing its volume, it is an important factor for the manufacturers concerned to provide an easy data input mode of the mobile phone.

SUMMARY OF THE INVENTION

The object aspect of the present invention is to provide a mobile phone, which has a battery cover equipped with an input interface so as to increase the input modes of the mobile phone.

According to one embodiment of the present invention, a battery cover of a mobile phone includes an input interface formed on one side thereof; and a wireless transmission module. The input interface is capable of operating thereon, and the wireless transmission module is capable of conducting wireless communication between the battery cover and the mobile phone when the battery cover is detached from the mobile phone.

A mobile phone is provided according to another embodiment of the present invention. The mobile phone includes a main unit, a first wireless transmission module, a first input interface and a battery cover. The first input interface is formed on a front side of the main unit. The battery cover is formed on a rear side of the main unit. The battery cover has a second input interface facing to an inner wall formed on the rear side of the main unit and a second wireless transmission module. The second input interface is capable of transmitting/receiving a wireless signal to/from the first wireless transmission module of the main unit via the second wireless transmission module when the battery cover is detached from the main unit.

In the mobile phone of one embodiment of the present invention, an additional operation mode is provided at a space that is not used previously. Therefore, the present mobile phone has several operation modes without occupying any additional space or volume.

When compared to the prior art technology, where cable-connected or wireless of standard keyboard is utilized for the traditional mobile phone, the mobile phone of the present invention obviously has additional operation modes without affecting the portability thereof. Thus, the problem of lacking additional operation mode encountered during use of the prior mobile phone is overcome.

BRIEF DESCRIPTION OF THE DRAWINGS

Other features and advantages of this invention will become more apparent in the following detailed description of the preferred embodiments of this invention, with reference to the accompanying drawings, in which.

DETAILED DESCRIPTIONS OF THE PREFERRED EMBODIMENTS

As mentioned in the prior technology, there always remain a problem under the consideration to provide multi-functions and compact size for the mobile phone, no convenient input mode is offered to the user of the mobile phone. The mobile phone disclosed in accordance with the present invention is provided with a battery cover, which offers an additional input interface so as to increase the input mode thereof under the existing space and volume. The following discloses one embodiment of the present invention. The structure thereof should not be limited only to the disclosed embodiment; several modifications may be encompassed within the spirit of the present invention.

Figure 1:
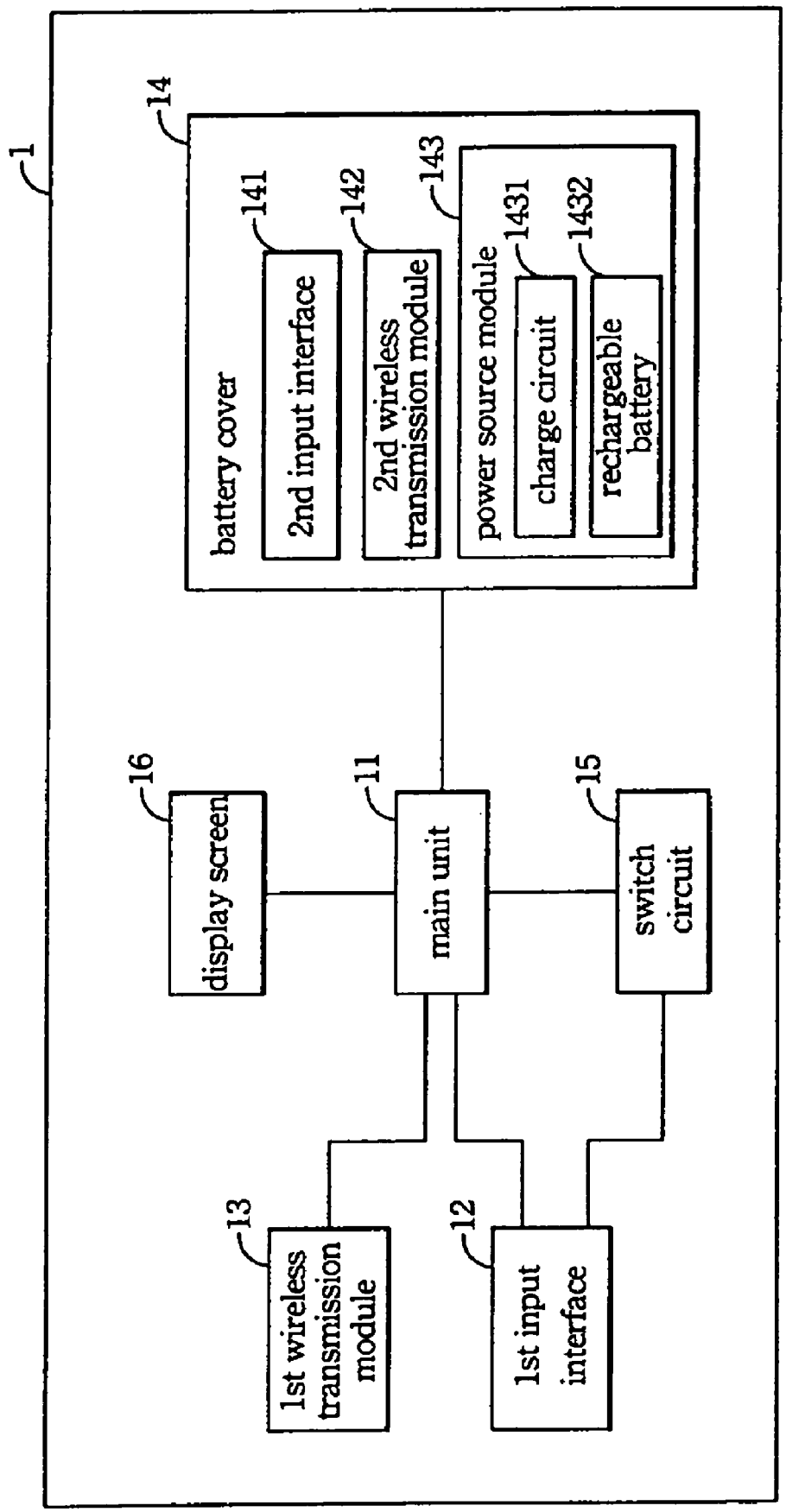
FIG. 1 is a block diagram illustrating one embodiment of the mobile phone of the present invention.

FIG. 1 is a block diagram illustrating one embodiment of the mobile phone 1 of the present invention. Accordingly, the mobile phone 1 includes a main unit 11, a first input interface 12, a first wireless transmission module 13, a battery cover 14, a switch circuit 15 and a display screen 16. The battery cover 14 has a second input interface 141, a second wireless transmission module 142 and a power source module 143. The switch circuit 15 is capable of switching an operation mode between the first input interface 12 and second input interface 141. The power source module 143 is capable of supplying power to operate the second input interface 141. The power source module 143 further includes a charge circuit 1431 and a rechargeable battery 1432. The user can work on the second input interface 141 when the battery cover 14 is detached from the main unit 11, thereby enabling the same to transmit/receive a wireless signal to/from the main unit 11 via the second wireless transmission module 141.

Figure 2A:
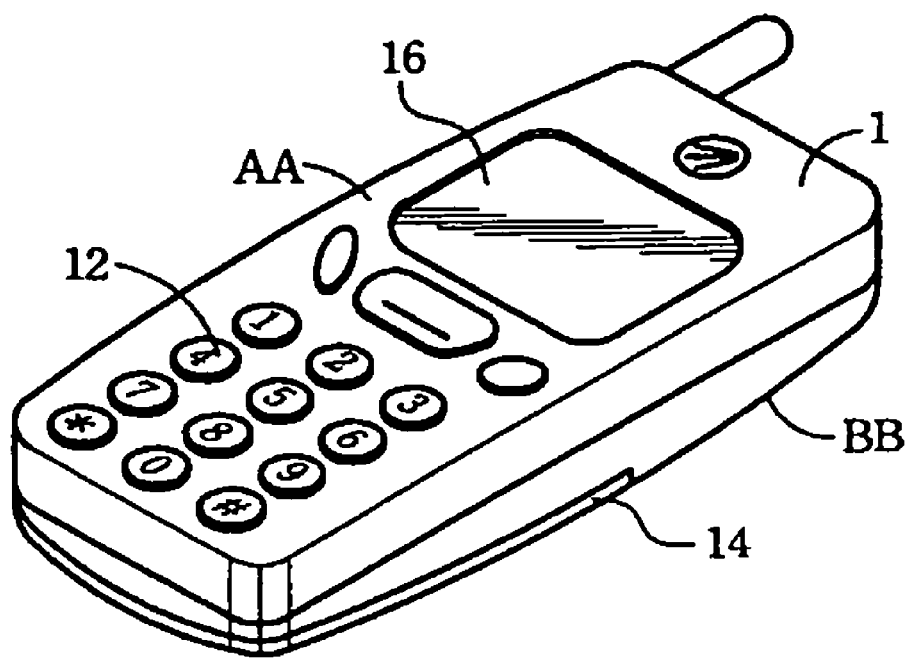
FIG. 2A illustrates a perspective view of one embodiment of the mobile phone of the present invention.
Figure 2B:
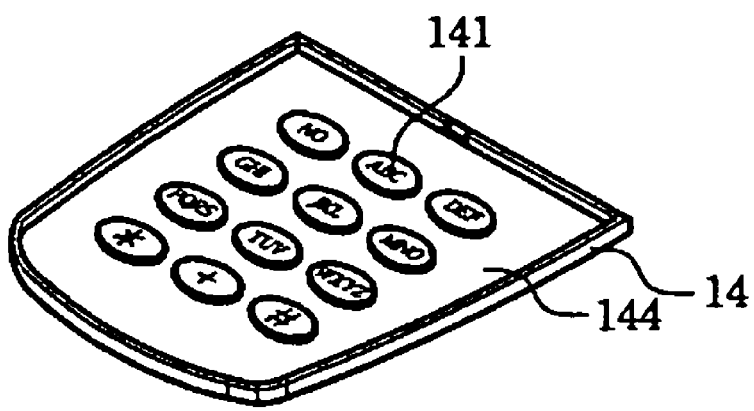
FIGS. 2B shows a battery cover removed from the main unit of the mobile phone of one embodiment of the present invention.

FIG. 2A illustrates a perspective view of one embodiment of the mobile phone 1 of the present invention. As illustrated, the main unit 11 has a front side AA formed with a display screen 16 and the first input interface 12. The main unit 11 further has a rear side BB formed with a battery chamber (not visible) and the battery cover 14 detachably covering the battery chamber. FIG. 2B shows the battery cover 14 removed from the main unit 11 of the mobile phone 1 of the present invention. As shown in FIG. 2B, the battery cover 14 is formed with a recess 144 to receive the second input interface 141 in such a manner that the second input interface 141 faces the inner wall of the battery chamber. When the battery cover 14 is removed from the main unit 11, the battery cover 14 can transmit or receive a wireless signal via the second wireless transmission module 142 (not shown in FIG. 2B) to the first wireless transmission module 13 of the main unit 11.

The first input interface 12 is used for input of data in the first operation mode while the second input interface 141 is for input of data in the second operation mode. In the previous embodiment, the first input interface 12 has a plurality of operating keys; each is imprinted with a number so that the user can press (i.e. by pressing means) the keys to input the corresponding numbers. The second input interface 141 has a plurality of keys; each is imprinted with a character or letter so that the user can press the keys to input the corresponding characters or letters in a text format. Note that the first and second input interfaces 12, 141 are used to illustrate the flexible use of the present invention, the structures thereof should not be limited only to the disclosed embodiment, but should cover various modification encompassed within the spirit of the present invention.

In case the operator needs an additional operation mode, he or she can simply remove the battery cover 14 from the main unit 11 so that he can work on the second input interface, thereby achieving the second operation mode. For instance, when the mobile phone 1 serves as a storage disk for a projection apparatus, the second input interface on the battery cover may serve as the wireless remote control unit to operate the display operation.

Figure 3A:
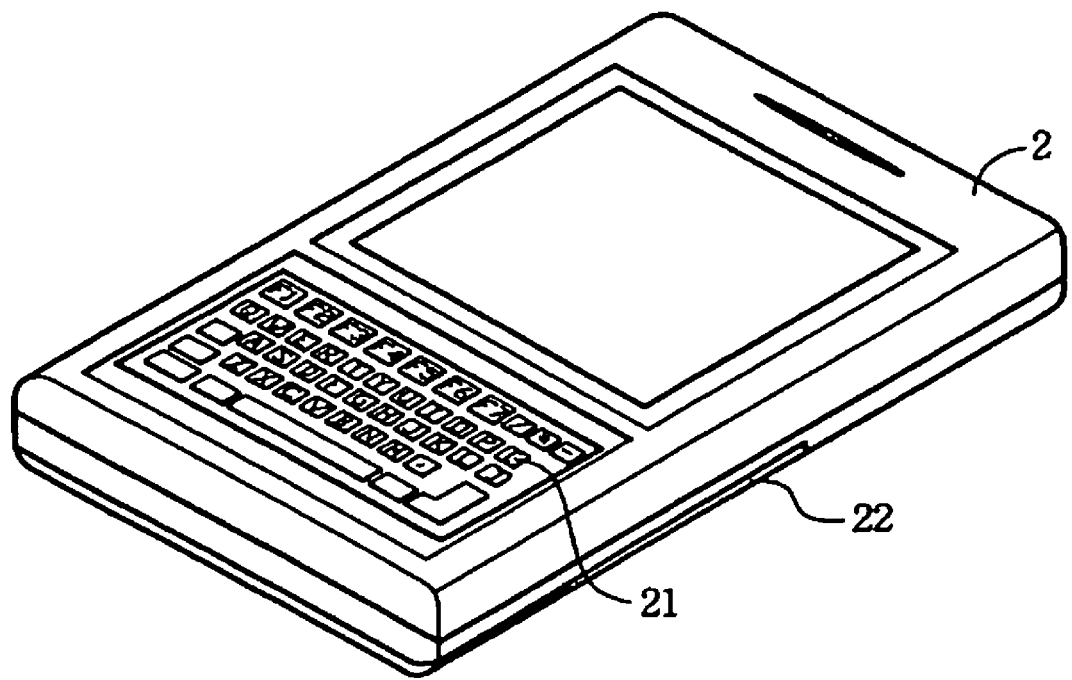
FIGS. 3A and 3B respectively show perspective views of another embodiment of the mobile phone of the present invention.
Figure 3B:
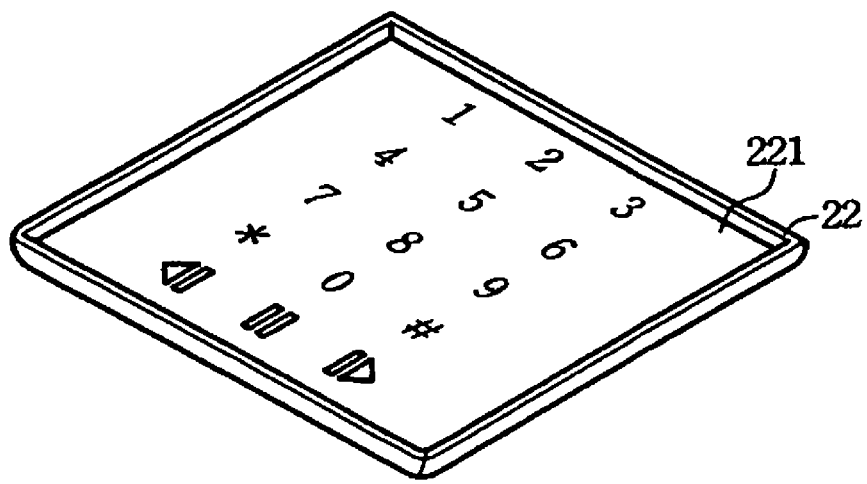

FIGS. 3A and 3B respectively show perspective views of another embodiment of the mobile phone 2 of the present invention, and has the structure similar to the previous embodiment. The only difference resides in that the first input interface 21 is used for input of character or letter in the text format while the second input interface 221 is a touch screen. As shown in FIG. 3B, the second input interface is used as remote control unit for transmitting control signal (corresponding to wireless signal) to perform specific tasks, such as activating the projection apparatus, play out a song.

In one embodiment, when the battery cover is mounted on the main unit, the charge circuit of the battery cover should contact the circuit board via the coupling pins (not shown) so as to charge the rechargeable battery. Then only, the second input interface can be operated once the battery cover is detached from the main unit.

As disclosed above, the second input interface is provided in the mobile phone of the present mobile phone without increasing the volume or area thereof. When compared to the wireless or cable-connected of standard keyboard of the prior art, the mobile phone of the present invention has increased input interface without affecting the portability thereof and thus enhances the user to carry the same along with him.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A mobile phone including a main unit, a first wireless transmission module, a first input interface and a battery cover, the first input interface being formed on a front side of the main unit, the battery cover being formed on a rear side of the main unit, the mobile phone comprising:
    the battery cover having a second input interface facing to an inner wall formed on the rear side of the main unit and a second wireless transmission module, wherein the second input interface is capable of transmitting/receiving a wireless signal to/from the first wireless transmission module of the main unit via the second wireless transmission module when the battery cover is detached from the main unit.

2. The mobile phone according to claim 1, further comprising a switch circuit for switching an operation mode between the first input interface and second input interface.

3. The mobile phone according to claim 1, wherein the battery cover further comprises a power source module for supplying power to operate the second input interface.

4. The mobile phone according to claim 3, wherein the power source module includes a charge circuit and a rechargeable battery coupled electrically to the charge circuit for charging the rechargeable battery.

5. The mobile phone according to claim 1, wherein the first input interface is capable of inputting numerals.

6. The mobile phone according to claim 1, wherein the second input interface is capable of inputting of words and characters.

7. A battery cover of a mobile phone, which includes a main unit having a rear side, the battery cover comprising:
    an input interface disposed on and facing an inner wall formed on the rear side of the main unit; and
    a wireless transmission module;
    wherein the input interface is capable of operating thereon, and the wireless transmission module is capable of conducting wireless communication between the battery cover and the mobile phone when the battery cover is detached from the mobile phone.

8. The battery cover according to claim 7, further comprising a power source module for supplying power to operate the input interface.

9. The battery cover according to claim 8, wherein the power source module includes a charge circuit and a rechargeable battery coupled electrically to the charge circuit for charging the rechargeable battery.

10. The battery cover according to claim 7, wherein the input interface is a keypad.

11. The battery cover according to claim 7, wherein the input interface is a touch screen.

* * * * *